United States Patent
Liu et al.

(10) Patent No.: US 10,488,707 B2
(45) Date of Patent: Nov. 26, 2019

(54) DIFFUSION ELEMENT AND MANUFACTURING METHOD THEREOF, BACKLIGHT MODULE AND DISPLAY DEVICE

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventors: Zhonghua Liu, Beijing (CN); Li Wang, Beijing (CN); Zhifu Zheng, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu (CN)

( * ) Notice: Subject to any disclaimer, the term of this patent is extended or adjusted under 35 U.S.C. 154(b) by 129 days.

(21) Appl. No.: 15/554,342

(22) PCT Filed: Mar. 29, 2017

(86) PCT No.: PCT/CN2017/078495
§ 371 (c)(1),
(2) Date: Aug. 29, 2017

(87) PCT Pub. No.: WO2018/018910
PCT Pub. Date: Feb. 1, 2018

(65) Prior Publication Data
US 2019/0101794 A1    Apr. 4, 2019

(30) Foreign Application Priority Data

Jul. 27, 2016  (CN) .......................... 2016 1 0601764

(51) Int. Cl.
*G02F 1/1335* (2006.01)
*G02F 1/1333* (2006.01)
*G02B 5/02* (2006.01)

(52) U.S. Cl.
CPC ..... *G02F 1/133606* (2013.01); *G02B 5/0242* (2013.01); *G02B 5/0278* (2013.01);
(Continued)

(58) Field of Classification Search
CPC .......... C04B 38/0655; C04B 35/62655; C04B 35/62897; C04B 35/78; H01L 51/0026;
(Continued)

(56) References Cited

U.S. PATENT DOCUMENTS 5,684,550 A  *  11/1997  Shibata ................ G02B 6/0051
349/162
5,706,134 A  *  1/1998  Konno ................ G02B 5/0226
359/452
(Continued)

FOREIGN PATENT DOCUMENTS

CN  1797093 A    7/2006
CN  1886447 A   12/2006
(Continued)

OTHER PUBLICATIONS

International Search Report and Written Opinion dated Jun. 1, 2017; PCT/CN2017/078495.

*Primary Examiner* — Thoi V Duong

(57) ABSTRACT

A diffusion element and manufacturing method thereof, a backlight module and a display device are provided. The diffusion element including a non-woven fabric diffusion sheet, wherein the non-woven fabric diffusion sheet includes a substrate of non-woven fabric and a diffusion particle layer (Continued)

attached to at least one surface of the substrate. The diffusion element has the advantages of low cost, high yield and simple processes.

20 Claims, 4 Drawing Sheets

(52) U.S. Cl.
CPC .. *G02F 1/133305* (2013.01); *G02F 1/133504* (2013.01); *G02F 1/133553* (2013.01)

(58) Field of Classification Search
CPC .. G02B 5/0242; G02B 5/0841; G02B 5/0268; G02B 5/02; G02B 6/0051; G02B 6/0055; G02B 2207/107; G02B 3/0012; G02B 5/0278; G02F 2001/133607; G02F 1/1335; G02F 1/133504; G02F 1/133553; G02F 1/1333; G02F 1/133305; G02F 1/133606

See application file for complete search history.

(56) References Cited

U.S. PATENT DOCUMENTS

| | | | |
|---|---|---|---|
| 2005/0068628 A1* | 3/2005 | Masaki | G02B 5/0226 359/599 |
| 2007/0128376 A1 | 6/2007 | Harada et al. | |
| 2009/0303414 A1 | 12/2009 | Chung et al. | |

FOREIGN PATENT DOCUMENTS

| | | |
|---|---|---|
| CN | 203720389 U | 7/2014 |
| CN | 205139517 U | 4/2016 |
| CN | 205982698 U | 2/2017 |

* cited by examiner

DIFFUSION ELEMENT AND MANUFACTURING METHOD THEREOF, BACKLIGHT MODULE AND DISPLAY DEVICE

TECHNICAL FIELD

At least one embodiment of the present disclosure relates to a diffusion element and a manufacturing method thereof, a backlight module and a display device.

BACKGROUND

Liquid crystal displays (LCDs) are more and more widely applied in the display field, but a LCD is not self-luminescent. Produced image light source is provided by a backlight module in the LCD. The backlight of the LCD requires uniform and high brightness.

No matter a light-emitting diode (LED) backlight or a cold cathode fluorescent lamp (CCFL) backlight, light emitted by the backlight is a point source or a line source but not a surface source. But when a backlight module adopts a diffusion film, the light can be distributed into a uniform surface light source. When the light runs through a diffusion layer, the result of optical diffusion is obtained by optical phenomena such as refraction and reflection continuously occurring in two media with different refractive indexes.

SUMMARY

At least one embodiment of the present disclosure relates to a diffusion element and a manufacturing method thereof, a backlight module and a display device, which provide a diffusion element having the advantages of low cost, high yield and simple processes.

At least one embodiment of the present disclosure provides a diffusion element, including a non-woven fabric diffusion sheet, wherein the non-woven fabric diffusion sheet includes a substrate of non-woven fabric and a diffusion particle layer attached to at least one surface of the substrate.

According to the diffusion element provided by an embodiment of the present disclosure, haze of the non-woven fabric diffusion sheet is in a range of 97%-99.7%; and light transmittance of the non-woven fabric diffusion sheet is in a range of 45%-48%.

According to the diffusion element provided by an embodiment of the present disclosure, a material of the non-woven fabric includes at least one selected from a group consisting of polypropylene (PP) and polyethylene (PE).

According to the diffusion element provided by an embodiment of the present disclosure, the diffusion particle layer includes a resin and diffusion particles dispersed in the resin.

According to the diffusion element provided by an embodiment of the present disclosure, particle size of the diffusion particles is in a range of 5 μm-10 μm.

According to the diffusion element provided by an embodiment of the present disclosure, a material of the diffusion particles includes at least one selected from a group consisting of polymethyl methacrylate (PMMA) and polyethylene terephthalate (PET).

At least one embodiment of the present disclosure further provides a backlight module, including the diffusion element provided by any one of the embodiments of the present disclosure.

According to the backlight module provided by an embodiment of the present disclosure, further including a metal frame, wherein an edge of the non-woven fabric diffusion sheet is fixed on the metal frame, and the non-woven fabric diffusion sheet is in a tension state.

According to the backlight module provided by an embodiment of the present disclosure, further including a light emitting element and a reflecting element, wherein the light emitting element is disposed between the non-woven fabric diffusion sheet and the reflecting element; and the backlight module is a direct-lit backlight module.

At least one embodiment of the present disclosure further provides a display device, including the backlight module provided by any one of the embodiments of the present disclosure.

According to the display device provided by an embodiment of the present disclosure, the display device includes a TV or a lamp.

At least one embodiment of the present disclosure further provides a method for manufacturing a diffusion element, including forming a non-woven fabric diffusion sheet, wherein forming the non-woven fabric diffusion sheet includes: providing a substrate of non-woven fabric, and forming a diffusion particle layer on at least one surface of the substrate.

According to the method for manufacturing the diffusion element provided by an embodiment of the present disclosure, forming the diffusion particle layer on the at least one surface of the substrate includes: providing a slurry containing diffusion particles; coating the slurry on the non-woven fabric; and drying the non-woven fabric coated with the slurry to form the diffusion particle layer.

According to the method for manufacturing the diffusion element provided by an embodiment of the present disclosure, the slurry also includes a resin, a curing agent and a solvent.

According to the method for manufacturing the diffusion element provided by an embodiment of the present disclosure, the resin occupies 85%-90% of the gross weight of the slurry; and the diffusion particles occupy 5%-8% of the gross weight of the slurry.

According to the method for manufacturing the diffusion element provided by an embodiment of the present disclosure, the resin includes acrylic resin; a material of the diffusion particles includes at least one selected from a group consisting of PMMA and PET; the curing agent includes polyurethane curing agent; and the solvent includes at least one selected from a group consisting of toluene, butanone and alcohol.

According to the method for manufacturing the diffusion element provided by an embodiment of the present disclosure, particle size of the diffusion particles is in a range of 5 μm-10 μm.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

Figure 1:
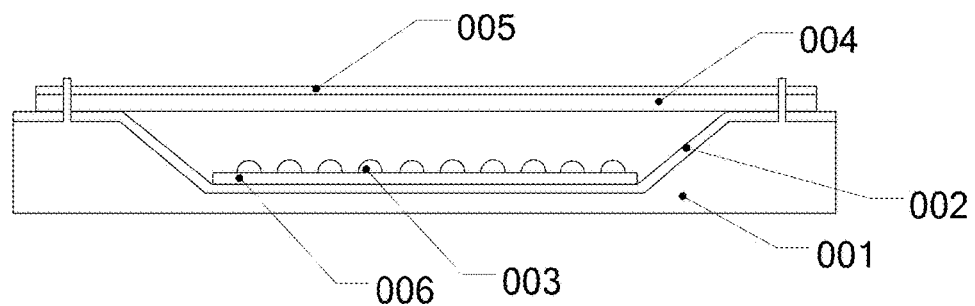
FIG. 1 is a schematic diagram of a backlight module.

FIG. 1 is a schematic diagram of a backlight module. A reflecting element 002 and a light emitting element 003 are disposed in a backplane 001; a diffusion plate 004 and a diffusion film 005 are also disposed on the backplane 001; and the light emitting element 003 is disposed between the reflecting element 002 and the diffusion plate 004. The light emitting element 003 can be disposed in a cavity of the backplane 001. A material of the diffusion film 005 generally includes polyethylene terephthalate (PET); a material of the diffusion plate 004 generally includes polystyrene (PS); and the reflecting element 002, for instance, can be reflecting paper. The backlight module is usually disposed on a non-display side of a display panel.

In general, the PET diffusion film adopts a coating process. The process requires the production processes such as coil feeding, coating of UV optical adhesive, exposure via a UV exposure machine, and coiling. In the coating process, the UV optical adhesive is prone to have the adverse phenomena such as scratches, white spots and foreign bodies.

The architecture of the diffusion film 005 and the diffusion plate 004 has the defects of high cost, easy warping, inapplicability for automatic production, complex processes, high fraction defective and the like, is detrimental to environmental protection as the body belongs to a chemical product, and cannot satisfy the higher requirement of photoelectric industry.

Figure 2:
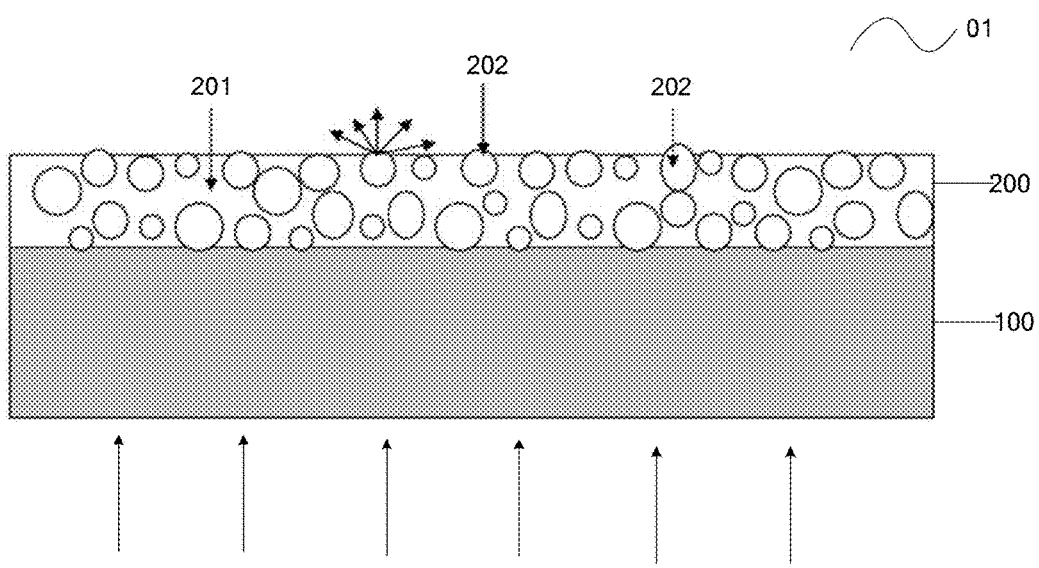
FIG. 2 is a schematic diagram of a diffusion element provided by one embodiment of the present disclosure.

As illustrated in FIG. 2, at least one embodiment of the present disclosure provides a diffusion element, which includes a non-woven fabric diffusion sheet 01. The non-woven fabric diffusion sheet includes a substrate of non-woven fabric 100 and a diffusion particle layer 200 attached to at least one surface of the substrate.

Non-woven fabric is also referred to as nonwoven cloth, is formed by directional or random fibers, is a new generation of environmentally friendly materials, and has the advantages of being moisture-proof, breathable, flexible, lightweight, non-combustion-supporting, easy to break down, non-toxic and non-irritating, rich in color, low in price, recyclable, etc. For instance, the non-woven fabric is produced by continuous one-step method including high-temperature melting, spinning, laying and hot press coiling, by taking granules (mostly adopting polypropylene (PP) materials) as raw materials. As the non-woven fabric has cloth appearance and some performances, the non-woven fabric is referred to as a cloth. Which mode is adopted by the non-woven fabric is not limited in the embodiments of the present disclosure.

The non-woven fabric has certain flexibility and high plasticity, has a certain degree of shielding and good shielding effect, and has certain light transmission and changeable light transmittance. The properties of the non-woven fabric provide possibility in taking the non-woven fabric as the substrate of the diffusion element. The diffusion particle layer attached to the at least one surface of the non-woven fabric can help to atomize the lamp shadow.

In the diffusion element provided by at least one embodiment of the present disclosure, as the non-woven fabric diffusion sheet is adopted, the manufacturing process and the fraction defective can be reduced; as the non-woven fabric is taken as the substrate of the diffusion sheet, environmental protection and safety can be achieved; as the diffusion particle layer is formed on the non-woven fabric substrate, the automatic production in the production line can be achieved; and as the non-woven fabric diffusion sheet is adopted, optical sheets can be reduced and the cost can be saved.

Compared with the conventional means of taking a PET diffusion film and a PS diffusion plate as a diffusion element, the adoption of the non-woven fabric diffusion sheet as the diffusion element has at least one of the following advantages.

(1) As raw materials of the non-woven fabric diffusion sheet have low cost (about 2RMB/kg), the cost is saved; and the conventional backlight module diffusion film has high architecture cost. For instance, the cost of raw materials of a PET substrate is very high (about 13RMB/kg).

(2) The post production process of the non-woven fabric diffusion sheet is simple (raw materials→cutting→framing→assembly), but the manufacturing process of the conventional diffusion film, e.g., the PET diffusion film, is complex (raw materials→coating→cutting→framing→assembly). The non-woven fabric diffusion sheet does not include the coating process as similar to the conventional diffusion film, so the process is simple.

(3) Manufacturing equipment of the non-woven fabric diffusion sheet has low investment, but coating equipment required by the conventional diffusion film, for instance, the PET diffusion film, has very high cost, so the overall architecture cost advantage is obvious.

(4) The conventional diffusion film architecture is not suitable for automatic production; and the less optical sheet materials used in automatic production, the more conductive to production (the less mechanical arms used in automatic production).

(5) When the non-woven fabric diffusion sheet in the embodiment of the present disclosure is adopted, the diffusion film and/or the diffusion plate are not required to be used.

(6) The non-woven fabric diffusion sheet has simple process, but the conventional diffusion film has complex process, is easy to be scratched, and has high fraction defective in the production process.

(7) As the body of the conventional diffusion film, for instance, the PET diffusion film, belongs to a chemical product, the diffusion film is not conductive to environmental protection.

The diffusion element is required to simultaneously have good light transmission and haze value within suitable range. The transparency of transparent materials is usually characterized by haze. The transparency of the transparent materials can be evaluated by measuring haze. For instance, the haze of the non-woven fabric diffusion sheet can be 97%-99.7%, and the light transmittance of the non-woven fabric diffusion sheet can be 45%-48%. For instance, when the haze of the non-woven fabric is improved, the shielding effect can be improved, which is conductive to atomize the lamp shadow; when the light transmittance of the non-woven fabric is increased, the brightness strengthening performance can be improved; and a balance point can be looked for in the above two contradictory parameters, the parameters can be designed. Moreover, for instance, in order to obtain good resultant effect, the light transmittance can be 48% and the haze can be 99.7%.

For instance, as illustrated in FIG. 2, the diffusion particle layer 200 includes a resin 201 and diffusion particles 202 dispersed in the resin 201. For instance, in order to allow the diffusion element to obtain better support, the non-woven fabric material includes at least one selected from a group consisting of PP and polyethylene (PE). For instance, in order to allow the diffusion element to obtain good balance between the haze and the light transmittance, a material of the diffusion particles include at least one selected from a group consisting of polymethyl methacrylate (PMMA) and PET. For instance, in order to allow the diffusion element to obtain good balance between the haze and the light transmittance, the particle size range of the diffusion particles is 5 μm-10 μm.

Figure 3:
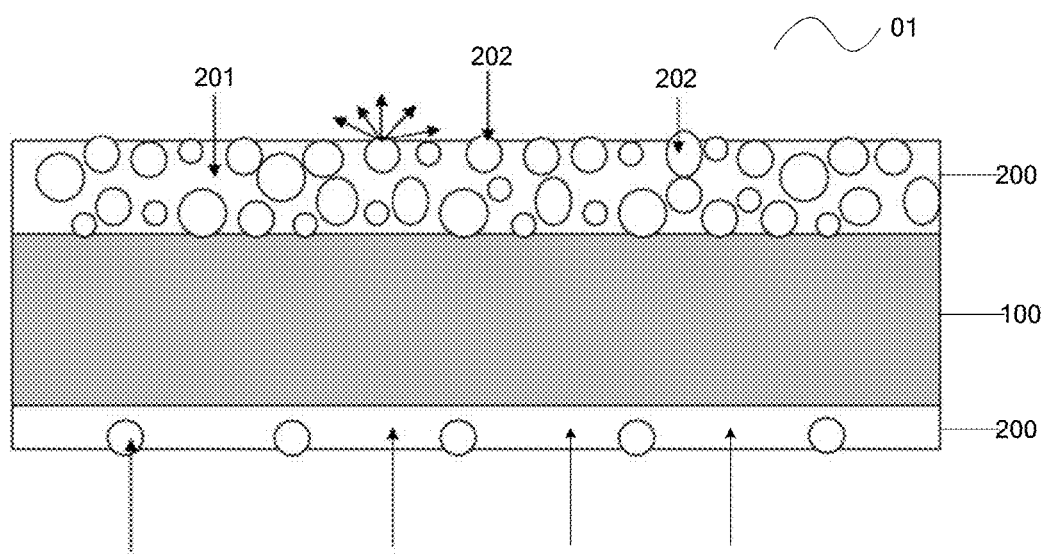
FIG. 3 is a schematic diagram of a diffusion element provided by another embodiment of the present disclosure.

In the embodiment of the present disclosure, the diffusion particle layer 200 is attached to at least one surface of the substrate, which can be as illustrated in FIG. 2: the diffusion particle layer 200 is attached to one surface of the substrate; and can also be as illustrated in FIG. 3: the diffusion particle layer 200 is attached to both two opposite surfaces of the substrate, and the density of the diffusion particles 202 in the diffusion particle layer 200 disposed on both sides of the substrate can be same and can also be different. No limitation will be given here.

For instance, except that the diffusion particles are attached to the at least one surface of the substrate, the diffusion particles can be also attached to slits of fibers for forming the non-woven fabric. No limitation will be given here in the embodiment of the present disclosure.

At least one embodiment of the present disclosure provides a backlight module, which includes any foregoing diffusion element.

The non-woven fabric diffusion sheet in the embodiment of the present disclosure employed as the diffusion element can replace the conventional architecture of the PET diffusion film and the PS diffusion plate.

Figure 4:
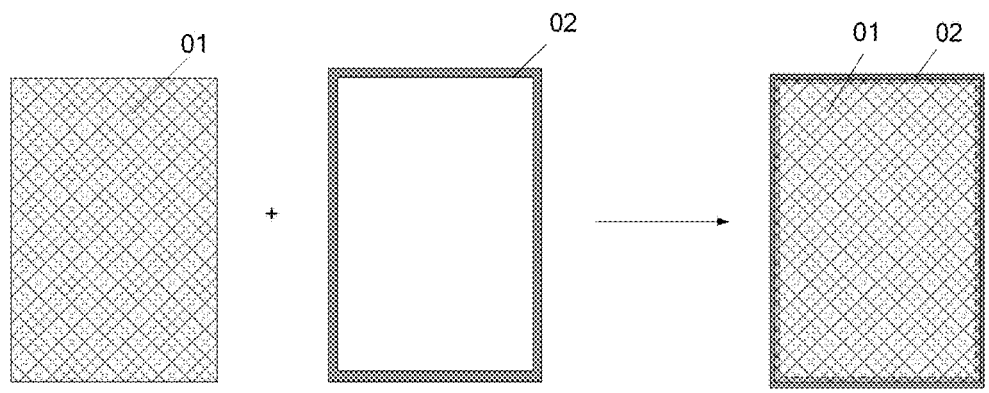
FIG. 4 is a schematic diagram illustrating a fixing between a metal frame and a diffusion element provided by one embodiment of the present disclosure.

For instance, in order to solve the stiffness problem in the assembly of the non-woven fabric diffusion sheet, the size of the non-woven fabric can be designed to be less than the size of a metal frame by utilization of the elastic shrinkage of the non-woven fabric; four sides of the non-woven fabric is fixed on a metal frame; and the metal frame is embedded into a frame element, e.g., a plastic frame, to ensure the stiffness. For instance, as illustrated in FIG. 4, the backlight module further includes a metal frame 02; and an edge of the non-woven fabric diffusion sheet 01 is fixed on the metal frame 02, and the non-woven fabric diffusion sheet 01 is in a tension state. For instance, a material of the metal frame 02 includes but not limited to stainless steel, aluminum, aluminum alloy, etc. When the metal frame 02 is made from stainless steel, the non-woven fabric diffusion sheet 01 fixed on the metal frame can have good stiffness. For instance, the edge of the non-woven fabric diffusion sheet 01 can be bonded onto the metal frame 02 through an adhesive. For instance, the adhesive can include but not limited to ethyl cyanoacrylate (ECA, also referred to as 2-cyano-2-propenoate). For instance, the non-woven fabric diffusion sheet can be directly fixed with the metal frame and then directly used in the assembly of the backlight module.

Figure 5:
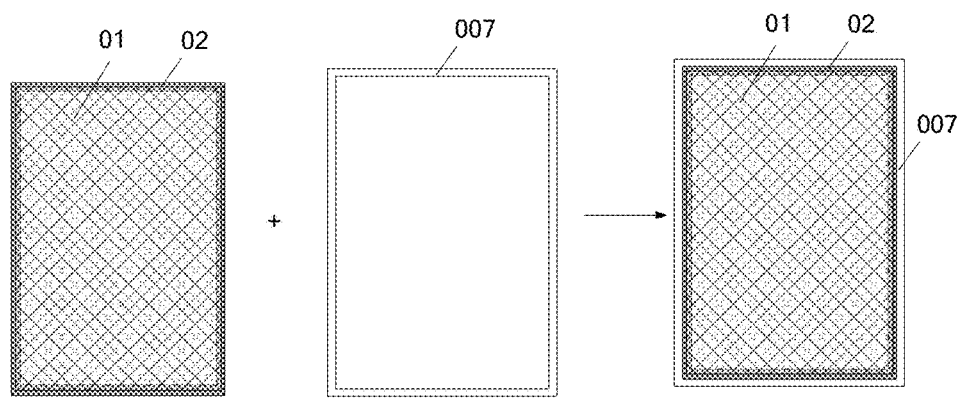
FIG. 5 is a schematic diagram illustrating a case that a diffusion element provided by one embodiment of the present disclosure is fixed with the metal frame and then embedded into a frame element.

For instance, as illustrated in FIG. 5, the metal frame 02 can be disposed in a frame element 007.

Figure 6:
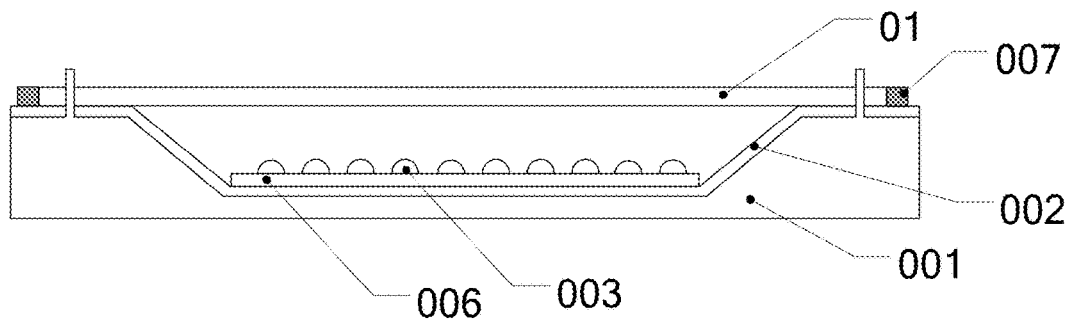
FIG. 6 is a schematic diagram of a backlight module provided by one embodiment of the present disclosure.

For instance, as illustrated in FIG. 6, the backlight module can further include a reflecting element 002 and a light emitting element 003; and the light emitting element 003 is disposed between the non-woven fabric diffusion element 01 and the reflecting element 002. The light emitting element 003 can be disposed in a cavity of the backplane 001.

For instance, the backlight module is a direct-lit backlight module. The light emitting element 003, for instance, includes a plurality of LED lamps, and the plurality of LED lamps can be disposed on a circuit board 006 to form an LED lamp bar. The circuit board 006, for instance, includes a flexible circuit board.

At least one embodiment of the present disclosure provides a display device, which includes any foregoing backlight module.

For instance, the display device includes but not limited to a television (TV) and a lamp.

At least one embodiment of the present disclosure provides a method for manufacturing a diffusion element, which includes forming a non-woven fabric diffusion sheet. Forming the non-woven fabric diffusion sheet includes: providing a substrate of non-woven fabric, and forming a diffusion particle layer on at least one surface of the substrate.

Figure 7A:
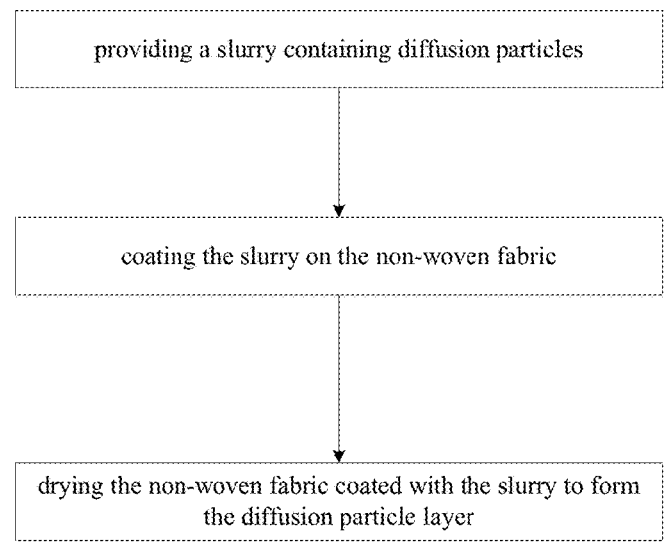
FIG. 7a is a schematic diagram of a manufacturing process of a diffusion element provided by one embodiment of the present disclosure.

For instance, as illustrated in FIG. 7a, forming the diffusion particle layer on the at least one surface of the substrate includes: providing a slurry containing diffusion particles;

coating the slurry on the non-woven fabric; and drying the non-woven fabric coated with the slurry to form the diffusion particle layer.

For instance, the slurry also includes a resin, a curing agent and a solvent. The resin, for instance, can adopt a UV curable resin, but not limited thereto. For instance, the resin can occupy 85%-90% of the gross weight of the slurry, and the diffusion particles can occupy 5%-8% of the gross weight of the slurry. For instance, the particle size of the diffusion particles can be about 5 μm-10 μm. For instance, the curing agent and the solvent can occupy 5%-8% of the gross weight of the slurry. The curing agent is taken as catalyst to accelerate the curing of the resin. Moreover, for instance, the resin occupies 90% of the gross weight of the slurry; the diffusion particles occupy 5% of the gross weight of the slurry; and the curing agent and the solvent occupy 5% of the gross weight of the slurry.

For instance, the resin includes acrylic resin; a material of the diffusion particles include at least one selected from a group consisting of PMMA and PET; the curing agent includes polyurethane curing agent; and the solvent includes at least one selected from a group consisting of toluene, butanone and alcohol.

It should be noted that the above description on the materials and the usage is only illustrative and not limitative. Other materials and usage can also be adopted. No limitation will be given here in the embodiment of the present disclosure.

Figure 7B:
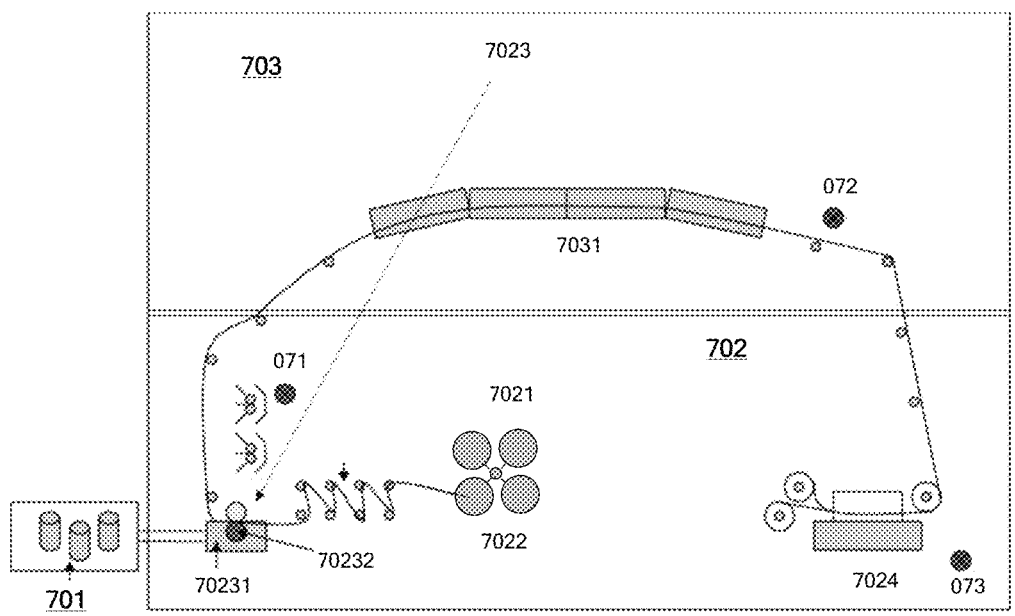
FIG. 7b is a schematic diagram of a manufacturing process of a diffusion element described with reference to an apparatus, provided by one embodiment of the present disclosure.

For instance, as illustrated in FIG. 7b, in a method for manufacturing the diffusion element, provided by one embodiment of the present disclosure, the slurry is prepared in a compounding room 701 and placed in a coating and receiving chamber 702. One-side coating mode can be adopted. Of course, double-sided coating mode can also be adopted. The slurry is coated on a large non-woven fabric coil 7021. The large non-woven fabric coil 7021 can be disposed on a coil cradle 7022. A coater 7023 can be adopted for coating. The coater 7023 can be disposed in the coating and receiving chamber 702 and includes a container 70231 for placing the slurry and a coating head 70232. The slurry can be disposed in the container 70231 for placing the slurry. The coating head 70232 can be disposed in the container 70231 for placing the slurry. After the coating of the slurry, a first detection 071 can be executed to detect whether the coating process is uniform. The coated non-woven fabric can be disposed in an oven 7031 of a drying chamber 703. After drying, a second detection 072 (for instance, detecting whether the diffusion particles are uniform) can be executed to detect whether the diffusion particles formed after drying satisfy the requirement, and subsequently, slitting and receiving can be performed in a slitting and receiving machine 7024. The slitting and receiving machine 7024 can be disposed in the coating and receiving chamber 702. After receiving, a third detection 073 (for instance, detecting the haze and the light transmittance of the non-woven fabric diffusion sheet) can be executed to detect whether the obtained non-woven fabric diffusion sheet satisfies the requirement. It should be noted that the method for manufacturing the diffusion element provided by the embodiment of the present disclosure is not limited to the foregoing method.

Figure 8:
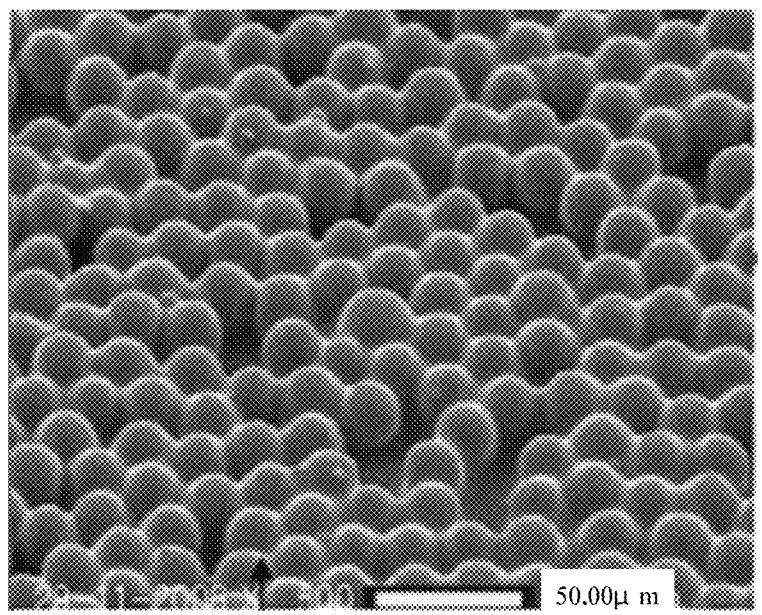
FIG. 8 illustrates an electron micrograph of a diffusion particle layer of a diffusion element provided by one embodiment of the present disclosure.

FIG. 8 illustrates an electron micrograph of a diffusion particle layer in a diffusion element provided by one embodiment. As seen from the figure, diffusion particles of the diffusion particle layer are closely arranged, and the particle size of the diffusion particles is about 5 μm-10 μm.

Any non-woven fabric diffusion sheet in the embodiment of the present disclosure can completely replace the architecture of the diffusion plate and the diffusion film. The following shows optical test data about the architecture purely adopting the non-woven fabric diffusion sheet in the present disclosure and the architecture adopting the diffusion plate and the diffusion film.

In Table 1 and Table 2, OC represents a display panel (open cell); L/B represents a lamp bar; 2835PKG is the LED model; NTSC represents the GB color gamut; and B8 NS1, DJ150, B8 N80 and KDD188NH are models.

TABLE 1

Test Data about Architecture of Non-woven fabric diffusion sheet

| Optical Architecture | | Optical Measurement Data | | | Optical Parameter | | Optical Color Gamut | | Optical Color Gamut (GB u'v') | |
|---|---|---|---|---|---|---|---|---|---|---|
| OC | | B8 N81 | 171 | 210 | 171 | Color Temperature | R | 0.637 | 0.3425 R | 0.4566 | 0.5282 |
| L/B | | 2835PKG | | | | Central Point X | 0.2818 G | 0.2992 | 0.6751 G | 0.1223 | 0.565 |
| LGP/DP | | Non-woven fabric diffusion sheet | 173 | 216 | 176 | Central Point Y | 0.2973 B | 0.148 | 0.0827 B | 0.1602 | 0.2014 |
| Optical Sheets | Reflection | DJ150 | | | | Uniform 9 Points | 76.39 NTSC | 69.45% | GB Color Gamut | 28.98% | |
| | Diffusion Composite | — — | 170 | 193 | 165 | | | | | | |

TABLE 2

Test Data about Architecture of PET Diffusion Film & PS Diffusion Plate

| Optical Architecture | Optical Measurement Data | | | Optical Parameter | | Optical Color Gamut | | Optical Color Gamut (GB u'v') | |
|---|---|---|---|---|---|---|---|---|---|
| OC | B8 N80 | 175 | 210 | 175 | Color Temperature | R | 0.6568 | 0.3315 R | 0.4336 | 0.5267 |
| L/B | 2835PKG | | | | Central Point X | 0.2818 G | 0.313 | 0.6751 G | 0.1294 | 0.5660 |

TABLE 2-continued

Test Data about Architecture of PET Diffusion Film & PS Diffusion Plate

| Optical Architecture | | Optical Measurement Data | | | Optical Parameter | | Optical Color Gamut | | | Optical Color Gamut (GB u'v') | |
|---|---|---|---|---|---|---|---|---|---|---|---|
| LGP/DP | Diffusion Plate | 183 | 223 | 186 | Central Point Y | 0.2973 B | 0.1357 | 0.0878 | B | 0.1572 | 0.2103 |
| Optical Sheets | Reflection DJ150 | | | | Uniform 9 Points | 76.68 NTSC | 70.61% | | GB Color Gamut | 30.19% | |
| | Diffusion KDD188NH | 177 | 200 | 171 | | | | | | | |
| | Composite — | | | | | | | | | 1 | |

As seen from Table 1 and Table 2, the non-woven fabric diffusion sheet in the embodiment of the present disclosure can achieve the effect of light diffusion. Compared with the optical architecture of the PET diffusion film and the PS diffusion plate, the optical parameters are not very different, so the non-woven fabric diffusion sheet can completely replace the architecture of the diffusion plate and the diffusion film. In the preparation process of the non-woven fabric diffusion sheet used in the Table 1, the resin occupies 90% of the gross weight of the slurry, and the diffusion particles occupy 5% of the gross weight of the slurry. For instance, the particle size range of the diffusion particles is 5 μm-10 μm. For instance, the curing agent and the solvent occupy 5% of the gross weight of the slurry. The resin adopts acrylic resin; a material of the diffusion particles is PMMA; the curing agent adopts polyurethane curing agent; and the solvent adopts butanone.

The following is to be noted.

(1) The same reference numerals denote the same elements/components unless otherwise defined.

(2) In the drawings of the present disclosure, only the structures related to the embodiments of the present disclosure are involved, other structures can refer to usual designs.

(3) In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

(4) The features in different embodiments or different features in the same embodiments can be combined without conflict.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

This application claims the benefit of priority from Chinese patent application No. 201610601764.5, filed on Jul. 27, 2016, the disclosure of which is incorporated herein in its entirety by reference as a part of the present application.

What is claimed is:

1. A diffusion element, comprising a non-woven fabric diffusion sheet, wherein the non-woven fabric diffusion sheet comprises a substrate of non-woven fabric and a diffusion particle layer attached to at least one surface of the substrate, and
a metal frame, wherein an edge of the non-woven fabric diffusion sheet is fixed on the metal frame, and the non-woven fabric diffusion sheet is in a tension state.

2. The diffusion element according to claim 1, wherein haze of the non-woven fabric diffusion sheet is in a range of 97%-991%; and light transmittance of the non-woven fabric diffusion sheet is in a range of 45%-48%.

3. The diffusion element according to claim 1, wherein a material of the non-woven fabric comprises at least one selected from a group consisting of polypropylene (PP) and polyethylene (PE).

4. The diffusion element according to claim 1, wherein the diffusion particle layer further comprises a resin, and diffusion particles are dispersed in the resin.

5. The diffusion element according to claim 4, wherein particle size of the diffusion particles is in a range of 5 μm-10 μm.

6. The diffusion element according to claim 4, wherein a material of the diffusion particles comprises at least one selected from a group consisting of polymethyl methacrylate (PMMA) and polyethylene terephthalate (PET).

7. A backlight module, comprising the diffusion element according to claim 1.

8. The backlight module according to claim 7, further comprising a light emitting element and a reflecting element, wherein the light emitting element is disposed between the nonwoven fabric diffusion sheet and the reflecting element; and the backlight module is a direct-lit backlight module.

9. A display device, comprising the backlight module according to claim 7.

10. The display device according to claim 9, wherein the display device comprises a TV or a lamp.

11. The diffusion element according to claim 1, further comprising a frame element, wherein the metal frame is embedded into the frame element.

12. The diffusion element according to claim 1, further comprising an adhesive, wherein the edge of the non-woven fabric diffusion sheet is bonded onto the metal frame.

13. A backlight module comprising a diffusion element, the diffusion element comprising a non-woven fabric diffusion sheet, wherein the non-woven fabric diffusion sheet comprises a substrate of non-woven fabric and a diffusion particle layer attached to at least one surface of, the substrate, and
wherein the backlight module further comprises a metal frame, wherein an edge of the non-woven fabric diffusion sheet is fixed on the metal frame, and the non-woven fabric diffusion sheet is in a tension state.

14. A method for manufacturing a diffusion element, comprising
forming a non-woven fabric diffusion sheet, wherein the non-woven fabric diffusion sheet is elastic, wherein forming the non-woven fabric diffusion sheet comprises:

providing a substrate of non-woven fabric, and forming a diffusion particle layer on at least one surface of the substrate;

providing a metal frame, wherein a size of the non-woven fabric is less than a size of the metal frame; and fixing an edge of non-woven fabric diffusion sheet on the metal frame to allow the non-woven fabric diffusion sheet to be in a tension state.

15. The method for manufacturing the diffusion element according to claim 14, wherein forming the diffusion particle layer on the at least one surface of the substrate comprises: providing a slurry containing diffusion particles: coating the slurry on the non-woven fabric; and drying the non-woven fabric coated with the slurry to form the diffusion particle layer.

16. The method for manufacturing the diffusion element according to claim 15, wherein the slurry also comprises a resin, a curing agent and a solvent.

17. The method for manufacturing the diffusion element according to claim 16, wherein the resin occupies 85%-90% of the gross weight of the slurry; and the diffusion particles occupy 5%-8% of the gross weight of the slurry.

18. The method for manufacturing the diffusion element according to claim 16, wherein the resin comprises acrylic resin; a material of the diffusion particles comprises at least one selected from the group consisting of PMMA and PET; the curing agent comprises polyurethane curing agent; and the solvent comprises at least one selected from a group consisting of toluene, butanone and alcohol.

19. The method for manufacturing the diffusion element according to claim 15, wherein particle size of the diffusion particles is in a range of 5 μm-10 μm.

20. The method for manufacturing the diffusion element according to claim 14, further comprising:

embedding the metal frame into a frame element.

* * * * *